J. McGAFFICK.
FRUIT GRADER.
APPLICATION FILED DEC. 4, 1914.

1,148,914.

Patented Aug. 3, 1915.

Attest:

Inventor:
by
Atty

UNITED STATES PATENT OFFICE.

JOHN McGAFFICK, OF ALBION, NEW YORK.

FRUIT-GRADER.

1,148,914. Specification of Letters Patent. Patented Aug. 3, 1915.

Application filed December 4, 1914. Serial No. 875,421.

*To all whom it may concern:*

Be it known that I, JOHN McGAFFICK, residing at and whose post-office address is 18 Platt street of the city of Albion, in the county of Orleans and State of New York, have invented certain new and useful Improvements in Fruit-Graders; and I do hereby declare the following to be a full, clear, and exact description of the invention, such as will enable others skilled in the art to which it appertains to make and use the same.

The object of my invention is to provide certain new and useful improvements in fruit graders primarily adapted for grading apples, peaches and oranges.

It is a legal requirement in the State of New York that apples placed on sale be graded and marked. It is essential to the successful accomplishment of this grading that the fruit be not agitated to such an extent as to bruise it. Consequently the common types of separators, available for use in grading other commodities and in which the sieves are agitated, are not adapted to the grading of the fruit mentioned.

Figure 1:
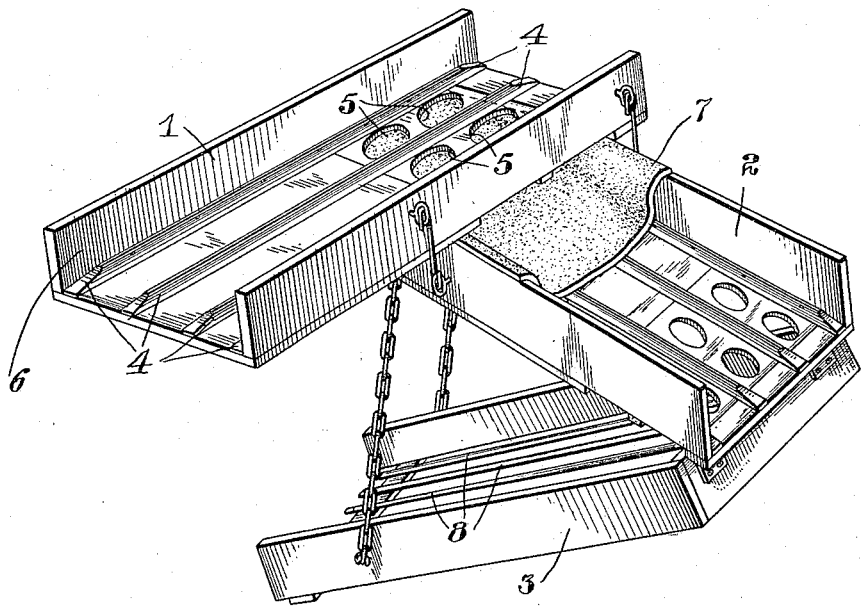
Figure 2:
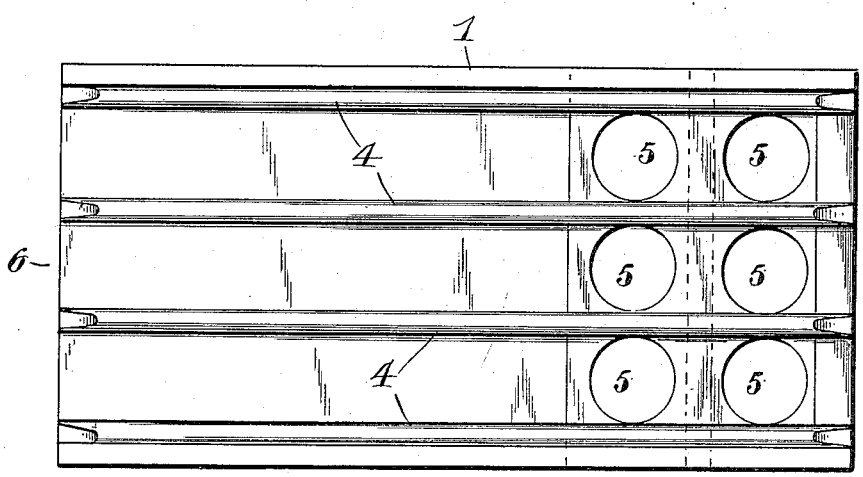

In the accompanying drawing, I have shown in Figure 1 a perspective view of a fruit grader embodying my invention. Fig. 2 is a plan view of one of the shelves.

As illustrated, the grader comprises three separating elements shown in the form of shelves 1, 2 and 3. These are superposed and each is arranged in a slanting position and in such relative communication that the fruit will pass through them successively, mainly by force of gravity with such additional manipulation as may be necessary, but without requiring agitation.

I have shown the shelf 1 provided with a series of beads or ribs 4 tending to form channels and preferably of rounded contour to avoid sharp edges that might tend to bruise the fruit. At the upper end of this shelf and within the respective channels, I provide a series of perforations 5 of the desired size to effect the first separation. These perforations are relatively large but not sufficiently so to permit the largest apples or other fruit to pass through them. They do, however, permit the smaller sizes to pass through. The largest fruit passes out of the open end 6 of the shelf into a suitable receptacle.

The smaller fruit drops through the perforations 5 onto shelf 2. To provide against bruising the fruit at this step, I provide shelf 2 with a suitable cushion shown in the form of a strip of canvas arranged transversely of the shelf and beneath the perforations 5. The shelf 2 is preferably arranged transversely of shelf 1 so that a receptacle may be arranged beneath its open end to receive the second grade of fruit which is too large to pass through the perforations 5. The shelf 3 is shown hinged to shelf 2 so that it may be disposed at any desired angle. I have shown this as provided with a series of longitudinal slats 8 having rounded contact surfaces over which the third grade fruit may pass to a receptacle while permitting the effective elimination of any small particles, stones, etc., that may have been carried along with the fruit.

I claim as my invention:—

1. In a fruit grader, a plurality of superposed inclined shelves adapted to be rigidly supported, each of said shelves having perforations affording communication with the succeeding shelf and a cushion below the perforations of the first shelf.

2. In a fruit grader, the combination with a shelf adapted to separate fruit of relatively large size, a second subjacent shelf having a cushion and adapted to receive the second sizes of fruit, said second shelf being provided with perforations, and a third shelf hinged to said second shelf and provided with a plurality of slats having rounded contact surfaces.

In testimony whereof, I have signed this specification in the presence of two subscribing witnesses.

JOHN McGAFFICK.

Witnesses:
 A. B. BOOTH,
 LORENZO BURROWS.